United States Patent [19]

Tanino et al.

[11] 4,440,212
[45] Apr. 3, 1984

[54] AIR-CONDITIONER FOR AN AUTOMOTIVE VEHICLE

[75] Inventors: Mikio Tanino; Yukio Shimada, both of Yokohama, Japan

[73] Assignee: Nissan Motor Company, Limited, Yokohama, Japan

[21] Appl. No.: 275,742

[22] Filed: Jun. 22, 1981

[30] Foreign Application Priority Data

Jul. 7, 1980 [JP] Japan ................................. 55-92562

[51] Int. Cl.³ ............................................. F25B 29/00
[52] U.S. Cl. ........................................ 165/12; 165/42;
165/103; 165/14; 62/239; 237/12.3 A; 98/2.08; 98/2.05
[58] Field of Search ...................... 165/23, 14, 42, 43,
165/2, 5, 15, 103, 65; 98/2.08, 2.05; 251/251,
279, 294, 252; 74/55, 57, 501 R, 96; 62/239;
237/12.3 A

[56] References Cited

U.S. PATENT DOCUMENTS

| 4,223,720 | 9/1980 | d'Orsay et al. | 165/43 |
| 4,227,569 | 10/1980 | Wattin | 165/35 |
| 4,355,681 | 10/1982 | Shimada | 165/16 |
| 4,382,463 | 5/1983 | Ikebukuro | 165/16 |

FOREIGN PATENT DOCUMENTS

| 43668 | 1/1982 | European Pat. Off. | 62/239 |
| 55-89013 | 6/1980 | Japan | 62/239 |
| 56-39913 | 4/1981 | Japan | 62/239 |
| 2064825 | 6/1981 | United Kingdom | 165/23 |

Primary Examiner—Albert W. Davis, Jr.
Assistant Examiner—S. Gayle Dotson
Attorney, Agent, or Firm—Lane, Aitken & Kananen

[57] ABSTRACT

An air conditioner for an automotive vehicle having (1) a duct having at its one end an air inlet, at the upper part of its other end a ventilation outlet, and at the lower part of its other end a floor outlet linked to a defroster outlet; (2) a blower disposed at the air inlet for introducing air into the duct; (3) an evaporator disposed downstream of the duct for cooling the air introduced by the blower; (4) a heater core disposed downstream of the evaporator whose upper side is provided with a first bypass for bypassing the cooled air from the evaporator; (5) an air mixing door disposed upstream of the heater core for adjusting the amount of air passing through the heater core; (6) an air mixing chamber disposed downstream of the heater core and first bypass for mixing the air from the first bypass and heater core, the ratio of the air depending on the angle of the air mixing door; (7) a second bypass disposed between the heater core and the floor outlet for introducing part of the heated air from the heater core directly into the floor outlet; and (8) a smaller door located at the heater core for adjusting the amount of heated air passing through the second bypass, whereby the air temperature at the floor outlet is higher by a constant amount from that at the ventilation outlet.

14 Claims, 17 Drawing Figures

BI-LEVEL

MAXIMUM HEATING

BI-LEVEL

MAXIMUM COOLING

MAXIMUM HEATING

BI-LEVEL

MAXIMUM COOLING

BI-LEVEL (2)

BI-LEVEL (3)

VENT

AIR-CONDITIONER FOR AN AUTOMOTIVE VEHICLE

BACKGROUND OF THE INVENTION

1. Field of the Invention

The present invention relates to an improved air-conditioner for an automotive vehicle and more particularly to an air-conditioner comprising an air duct, with an air inlet at one end thereof, blowing outlets directed toward the passenger compartment having a ventilation outlet and a floor outlet, a blower provided near the air inlet for introducing the air into an air duct, an evaporator for cooling the air introduced from the blower, a heater core provided downstream of the evaporator with a bypass for part of the air, an air mixing door provided upstream of the heater core so as to adjust the amount of air passing through the heater core, another smaller bypass for introducing some of the heated air passed through the heater core into the floor outlet, and a smaller door located at a heater core to adjust the amount of heated air passing through the other smaller bypass.

2. Description of the Prior Art

A conventional air-conditioner mounted within an automotive vehicle comprises:

(a) an air inlet of a duct located at one end thereof;

(b) a ventilation outlet and floor outlet located at the upper and lower parts of the other end of the duct;

(c) a blower located beside the air inlet introducing the air from the air inlet into the duct;

(d) an evaporator located downstream of the blower cooling the air introduced from the blower;

(e) a heater core located downstream of the evaporator with a bypass provided above the heater core for bypassing some of the air passed through the evaporator;

(f) an air mixing door located upstream of the heater core so as to cover the heater core in its fully closed state to adjust the amount of air passing through the heater core;

(g) an air mixing chamber located downstream of the heater core and the bypass mixing the air cooled by the evaporator which has been passed through the bypass to the ventilation door with the air heated by the heater core in a ratio according to the angle of the air mixing door so as to blow out most of the cooled air through the ventilation outlet and most of the warmed air through the floor outlet, or through a defroster outlet linked to the floor outlet if required.

In the air-conditioner described above, however, the angle of the air mixing door with respect to the heater core determines the air temperature both at the ventilation outlet and at the floor outlet, so that it is difficult to adjust the air temperature only at the ventilation outlet or at the floor outlet. For this reason, there arises a problem that the increased angle of the air mixing door involves the increased temperature in the vicinity of the ventilation outlet in order to raise the air temperature in the vicinity of the floor outlet particularly when both ventilation and floor outlets are opened, so that such air-conditioner cannot provide a comfortable environment within the passenger compartment.

SUMMARY OF THE INVENTION

With the above-described problem in mind, it is a primary object of the present invention to provide an improved air-conditioner for an automotive vehicle wherein, in addition to the known elements of the conventional air-conditioner, there are provided a warmed air bypass through which part of the air passed through the heater core is introduced directly into a floor outlet and a smaller air mixing door, in combination with the warmed air bypass, located upstream or downstream of the heater core for opening or closing the warmed air bypass, so that the air from the floor outlet can be at a constant temperature difference from that at the ventilation outlet.

BRIEF DESCRIPTION OF THE DRAWINGS

The features and advantages of the present invention will be appreciated from the following description taken in conjunction with the accompanying drawings in which like reference numerals designate corresponding elements, and in which.

DESCRIPTION OF THE PREFERRED EMBODIMENTS

Reference will now be made to the drawings, and first to FIG. 1 which is a sectional view of a conventional air-conditioner.

Figure 1:
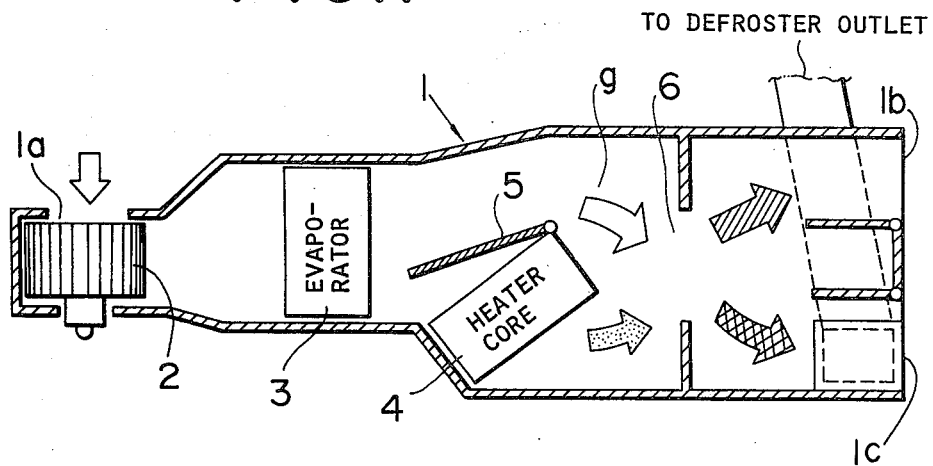
FIG. 1 is a sectional view showing a conventional air-conditioner.

In FIG. 1, numeral 1 denotes a duct having an air inlet 1a at one end thereof and a ventilation outlet 1b and floor outlet 1c linked to a defroster outlet (not shown) at the other end thereof. A blower 2 introducing air from the air inlet 1a into the duct 1 is provided at the air inlet 1a. An evaporator 3 linked to a cooling system (not shown) is provided downstream of the blower 2 cooling the air introduced by the blower 2. A heater core 4 linked to an engine cooling system (not shown) is provided downstream of the evaporator 3 with a first bypass g adjacent to the heater core 4. An air mixing door 5 is provided upstream of the heater core 4 so as to cover one end of the heater core 4 in its fully closed position to adjust the amount of air passing through the heater core 4. An air mixing chamber 6 provides a means for mixing the air that has passed through the heater core 4 with that which has passed through the evaporator 3 and the air bypass g according to the angle of the air mixing door 5. After passing through the air mixing chamber 6, most of the cooled air is blown out from the ventilation outlet 1b while most of the heated air is blown out from the floor outlet 1c.

Figure 2:
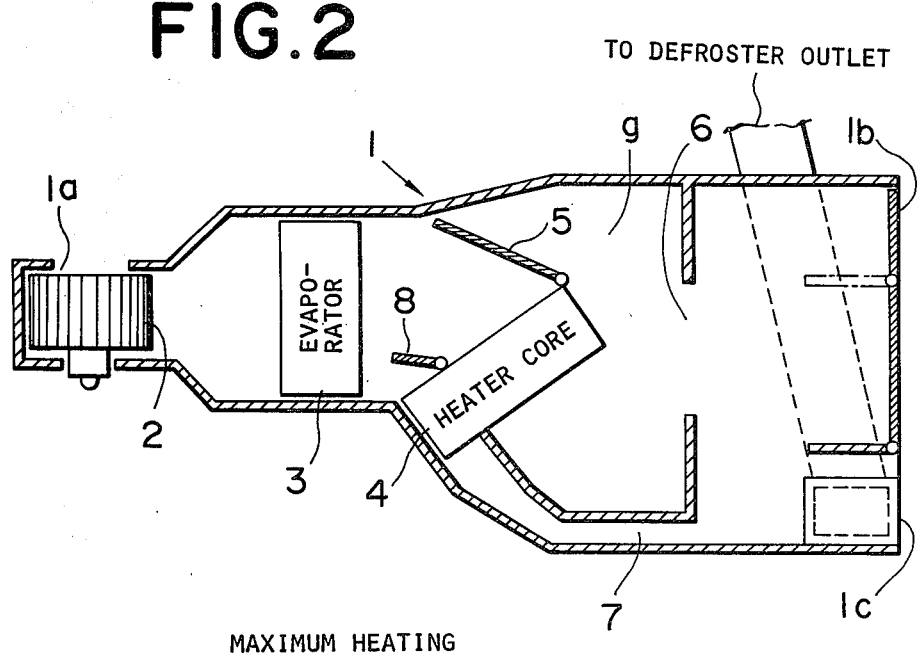
FIG. 2 is a sectional view showing an air-conditioner of the first preferred embodiment according to the present invention wherein another smaller door is juxtaposed to the air mixing door, in the maximum heating state.

FIG. 2 shows a first preferred embodiment of the present invention according to the present invention. In the first preferred embodiment shown in FIG. 2, another smaller door 8 is juxtaposed to the air mixing door 5 to adjust the amount of heated air passing into a warm air bypass 7 through the heater core 4. When the air-conditioner is set to its maximum heating state as shown in FIG. 2, both the air mixing door 5 and the smaller door 8 are fully opened so that almost all the air from the blower 2 is passed through the heater core 4, blowing out only from the floor outlet 1c at a required heating temperature. In this case, the smaller door may be fully closed.

Figure 3:
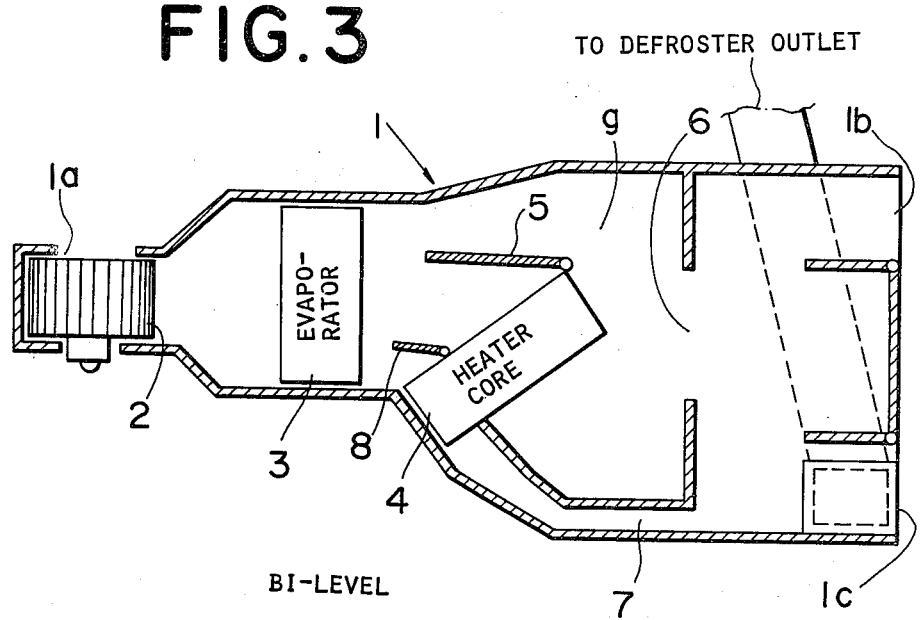
FIG. 3 is a sectional view showing the first preferred embodiment shown in FIG. 2 in a bi-level air-conditioning state.

In FIG. 3 which shows a bi-level air-conditioning state of the air-conditioner, where the air mixing door 5 is opened to an appropriate angle. According to the angle of the air mixing door 5, the heated air passed through the heater core 4 and the cooled air bypassed around the heater core 4 are mixed in the air mixing chamber 6, the former mostly blowing out from the floor outlet 1b and the latter mostly blowing out from the ventilation outlet 1c into the passenger compartment. In the bi-level state, if the smaller door 8 is opened, the heated air passed through the heater core 4 whose amount depends on the angle of the smaller door 8 is sent directly through the floor outlet 1c. Thus, the temperature of the air from the floor outlet 1c increases as the smaller door 8 is opened. With the smaller door fully open, the difference between the temperature of the air from the floor outlet 1c and that from the ventilation outlet is at a maximum. The temperature of the air from the floor outlet 1c, at this time, is considerably higher than that from a conventional air-conditioner.

Figure 4:
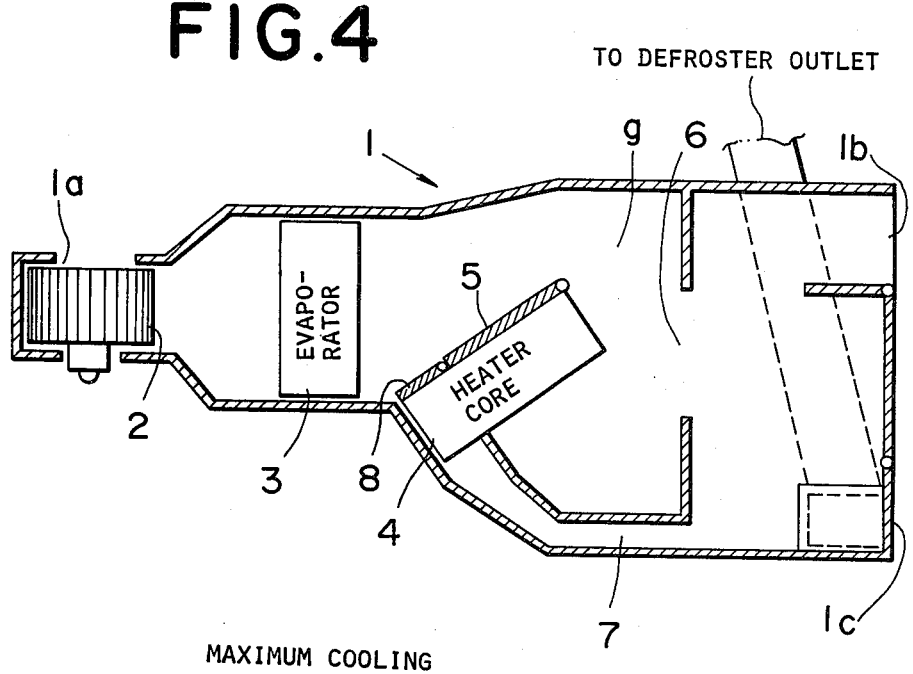
FIG. 4 is a sectional view showing the first preferred embodiment shown in FIG. 2 in the maximum cooling state.

FIG. 4 shows the maximum cooling state of the air-conditioner in the first preferred embodiment. In this case, both the air mixing door 5 and the smaller door 8 are fully closed so that the air impelled by the blower 2 is cooled in the evaporator 3 and sent through the first bypass g (not through the heater core 4) to the ventilation outlet 1b.

Figure 5:
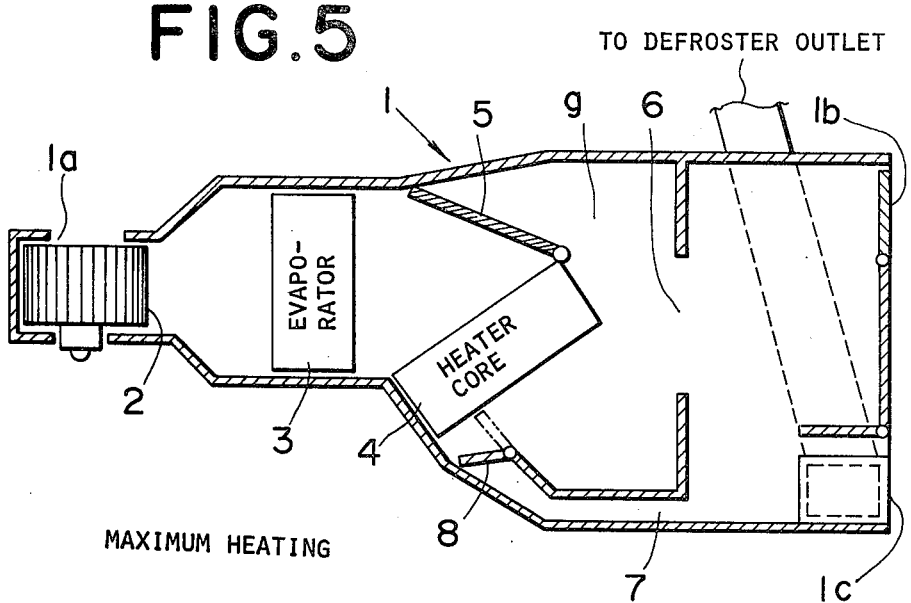
FIG. 5 is a sectional view of an air conditioner of a second preferred embodiment according to the present invention wherein the smaller door is provided downstream of the heater core and at the inlet of the second bypass, in the maximum heating state.
Figure 6:
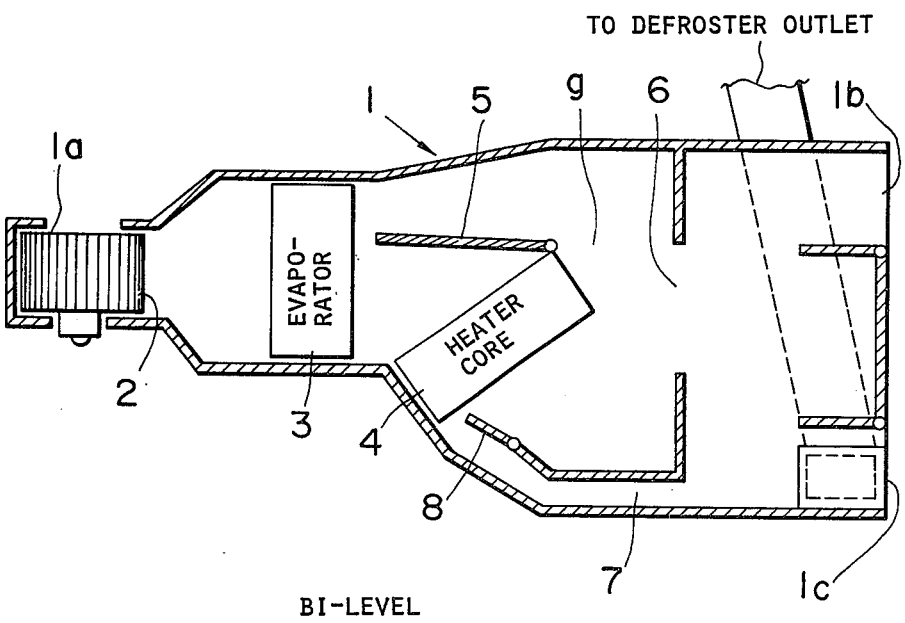
FIG. 6 is a sectional view of an air conditioner of the second preferred embodiment shown in FIG. 5 in the bi-level air-conditioning state.
Figure 7:
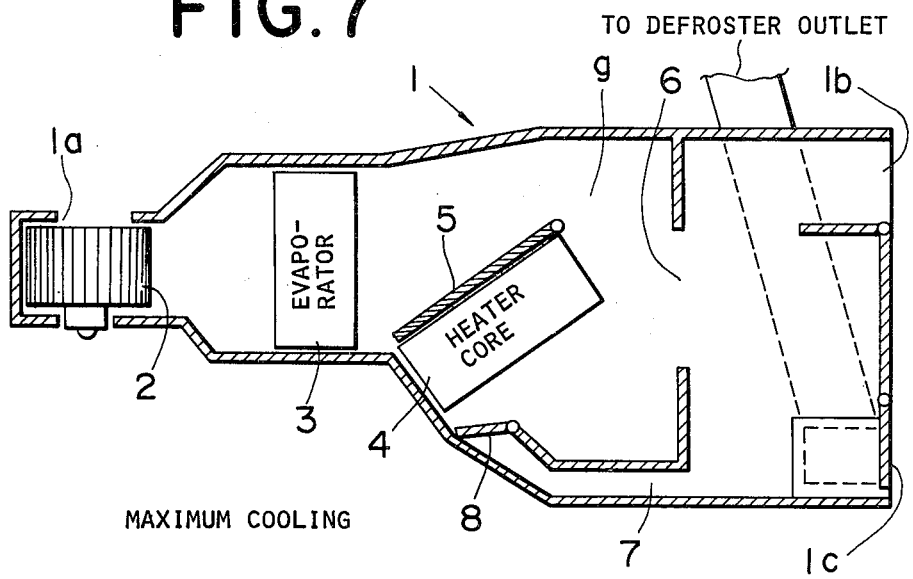
FIG. 7 is a sectional view of an air conditioner of the second preferred embodiment shown in FIG. 5 in the maximum cooling state.

FIGS. 5 through 7 show a second preferred embodiment according to the present invention. In this preferred embodiment, the air mixing door 5 is rotatably attached to the front of the heater core 4 so as to cover the front of the heater core 4 in its fully closed position, the air mixing door 5 performing the adjustment of the amount of air passing through the heater core 4 and the smaller door 8 located behind and below the heater core (i.e., in front of the second bypass 7) in order to adjust the heated air to be passed through the warmed air bypass 7.

As shown in FIG. 5, the air mixing door 5 is fully opened so that all the air impelled by the blower 2 is passed through the heater core 4 to provide heated air for the floor outlet 1c. (In this state, the smaller door 8 may be in either position shown by either the solid and the dotted lines).

FIG. 6 shows the bi-level air-conditioning state of the air-conditioner in the second preferred embodiment. In this state, the air mixing door 5 is opened to a certain angle so that the air passed through the heater core 4 whose amount depends on the angle of the air mixing door and cooled air passed through the bypass g are sent into the air mixing chamber 6. Therefore, the cooled air is blown out from the ventilation outlet 1b while the warmed air is blown out from the floor outlet 1c. In this bi-level air-conditioning state, the smaller door 8 is opened in the direction marked by an arrow so that some of the air passing through the heater core 4 is sent directly through the floor outlet 1c. Consequently, the air temperature at the floor outlet 1c is raised and as the smaller door 8 is further opened the air temperature at the floor outlet 1c is further raised. With the smaller door 8 fully opened, the difference between the temperature of the air from the floor outlet and that from the ventilation outlet is at a maximum.

FIG. 7 shows the maximum cooling state of the air-conditioner in the second preferred embodiment. In this state, the air mixing door 5 is fully closed so that the heater core 4 is blocked. The air impelled by the blower 2 is cooled by the evaporator 3 not heated by the heater core 4 and is sent out through the bypass g to provide cooled air for the ventilation outlet 1b. (In this state, the smaller door 8 may be open or closed).

Figure 8:
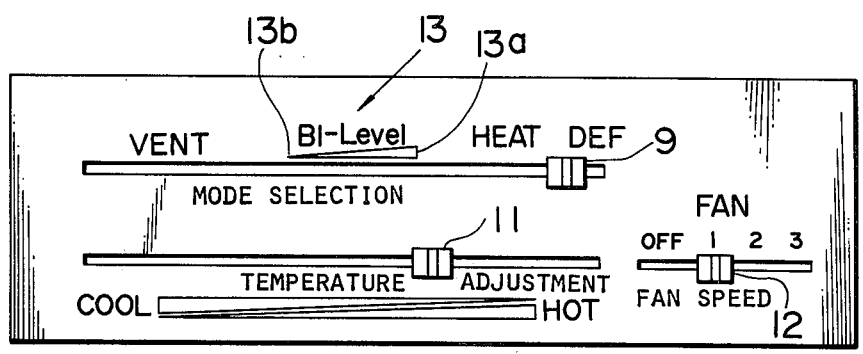
FIG. 8 shows an air conditioner control panel whereby the smaller door is rotated to open or close the second bypass by the manipulation of a mode selection lever.

FIG. 8 shows the control panel of the air conditioner according to the present invention and FIGS. 9 through 14 show a third preferred embodiment according to the present invention wherein an interlocking device is provided between the smaller door 8 and a mode selection lever 9.

FIG. 8 is a front view of the control panel of the air-conditioner. In FIG. 8, numeral 11 denotes a temperature adjusting lever by which the air mixing door 5 is operated, numeral 12 denotes a fan lever for setting the fan speed, numeral 13 denotes the bi-level temperature control range, numeral 13a denotes the position of the maximum temperature difference between the air from the ventilation outlet and that from the floor outlet, and numeral 13b denotes the position of the minimum temperature difference between the air from the ventilation outlet and the floor outlet.

Figure 9:
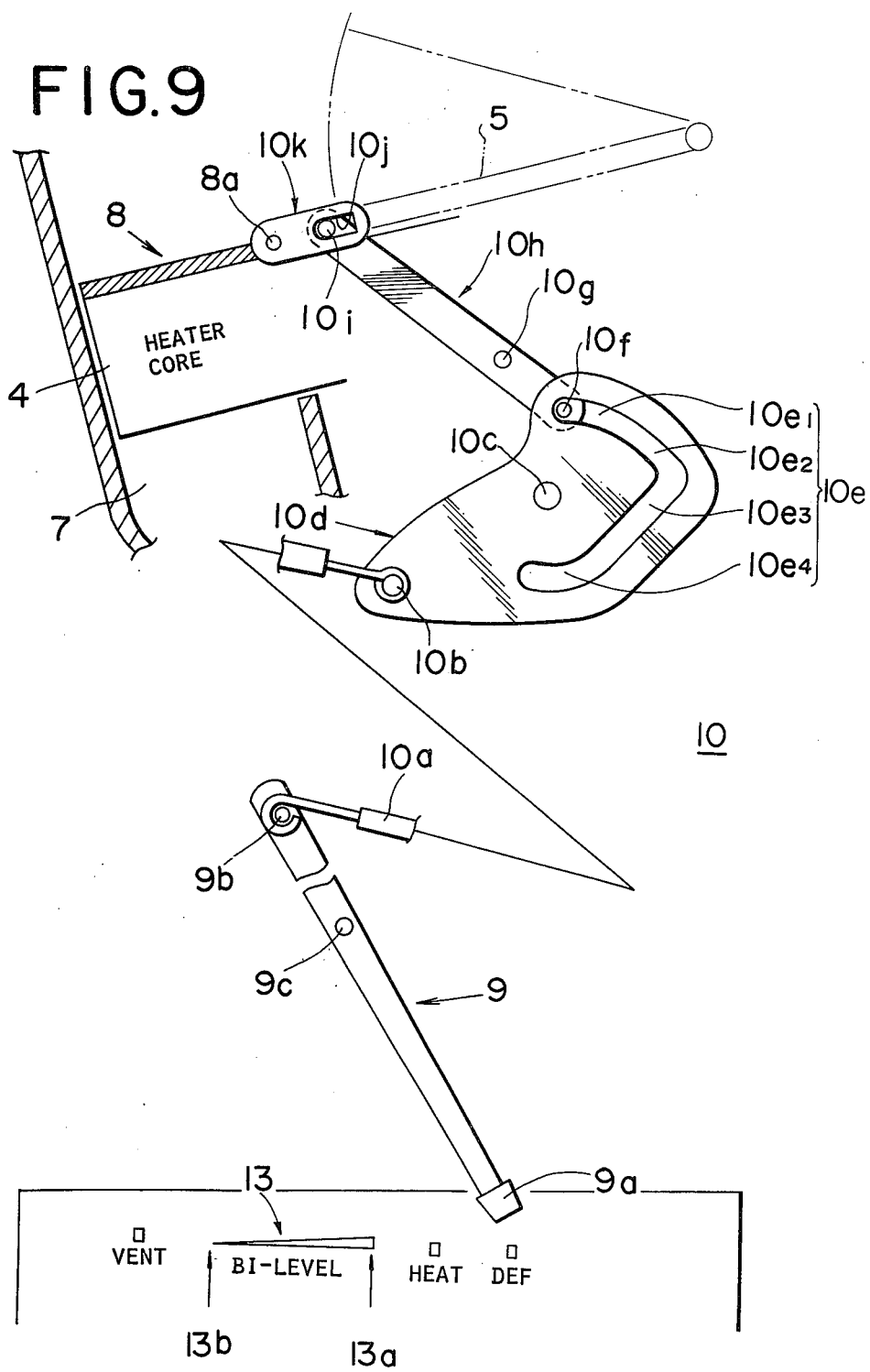
FIG. 9 shows the relative position of the smaller door when the mode selection lever is placed at the "DEF" position on the control panel in a third preferred embodiment according to the present invention.

As shown in FIG. 9, the mode selection lever 9 has a knob 9a at one end thereof and a pin 9b at the other and thereof pivotally supporting the cable 10a of the interlocking device 10 to be described hereinafter. Near the centre of the mode selection lever 9, as shown in FIG. 9, a supporting pin 9c is pivotted on a bearing (not shown in this drawing), the mode selection lever 9 rotating about the supporting pin 9c.

The interlocking device 10 comprises the cable 10a whose one end is pivotally supported about the pin 9b of the mode selection lever 9 and whose other end is pivotally supported about a pin 10b, a rotatable link 10d which rotates about a supporting pin 10c pivotally supported by means of a bearing (not shown in FIG. 9), a rotatable arm 10h with a projection 10f at one end which is fitted into a groove 10e of substantially inversed L shape, and a central part which is supported by means of a bearing (not shown in FIG. 9) on a supporting pin 10g, and a linkage 10k whose one end is provided with a slot 10j into which a projection 10i provided at the other end of the rotatable arm 10h is fitted and whose other end is fixed to the hinge pin 8a of the smaller door 8. (In FIGS. 9 through 14, the smaller door 8 is located upstream of the heater core 4 but may be located downstream of the heater core 4 as shown in FIGS. 5 through 7.)

The action of the air conditioner of the construction described above will now be described.

(1) As shown in FIG. 9, the mode selection lever 9 is placed at the "DEF" position. In this state, the projection 10f of the rotatable arm 10h is at a first end of the groove 10e of the rotatable link 10d so that the smaller door 8 is fixed in its fully closed position.

Figure 10:
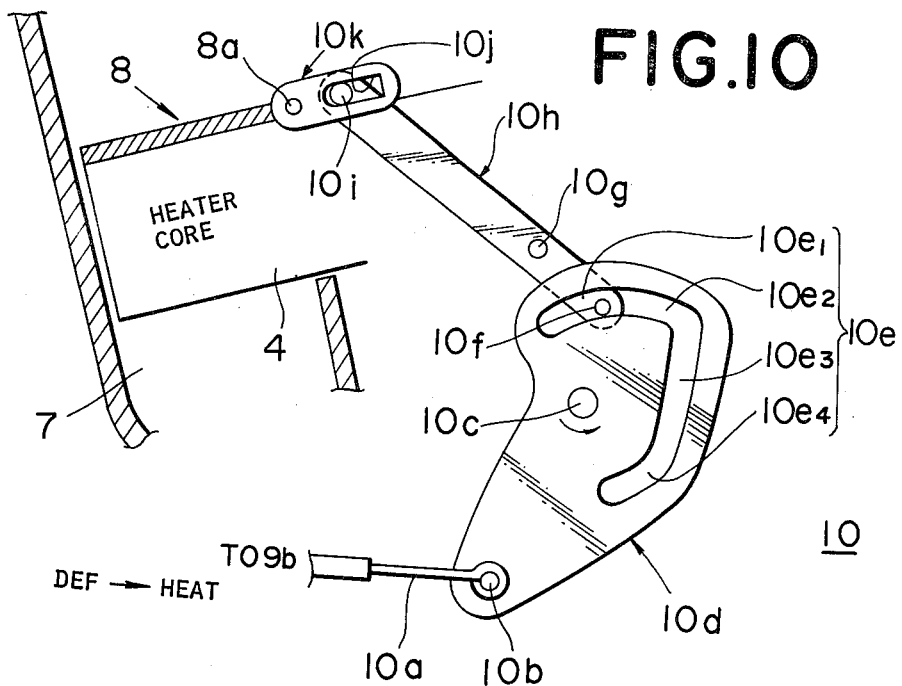
FIG. 10 shows the relative movement of the smaller door when the mode selection lever is moved from the "DEF" position to the "HEAT" position on the control panel in the third preferred embodiment.

(2) As shown in FIG. 10, the mode selection lever 9 is moved from the "DEF" position to the "HEAT" position. The rotatable link 10d rotates in the direction of the arrow about the supporting pin 10c through an angle corresponding to the displacement of the mode selection lever 9. Since the shape of the segment 10e₁ of the groove 10e is substantially a circular arc with the supporting pin 10c as its center, neither the rotatable arm 10h nor the linkage arm 10k moves, and the smaller door 8 is maintained in its fully closed position.

Figure 11:
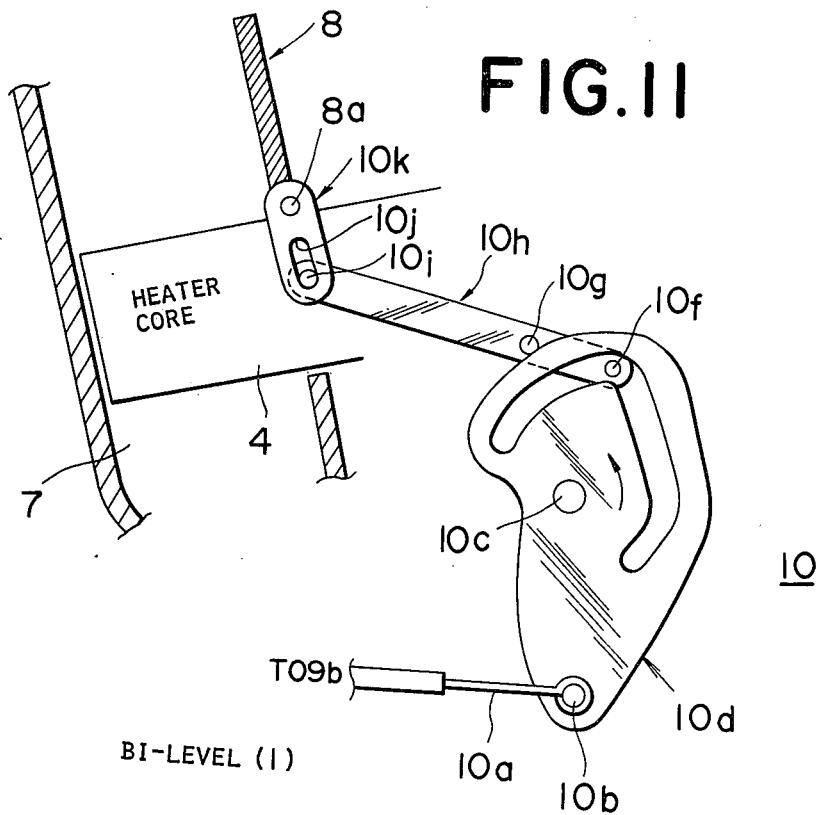
FIG. 11 shows the relative movement of the smaller door when the mode selection lever is moved to a first end of the "BI-LEVEL" range adjacent to the "HEAT" position in the third preferred embodiment.

(3) As shown in FIG. 11 showing the "BI-LEVEL"(1), the mode selection lever 9 is moved toward the right-hand end 13a of the "BI-LEVEL" range 13 from the "HEAT" position.

Although the rotatable link 10d still rotates counterclockwise, the shape of the segment 10e₂ of the groove 10e is designed to have the longest distance from the center 10c. Consequently, the smaller door 8 is made fully opened by rotating the rotatable arm 10h and linkage arm 10k. In this state, the amount of heated air passing through the second bypass 7 is maximized so that the temperature difference between the air from the ventilation outlet (16) and floor outlet (1c) is at a maximum.

Figure 12:
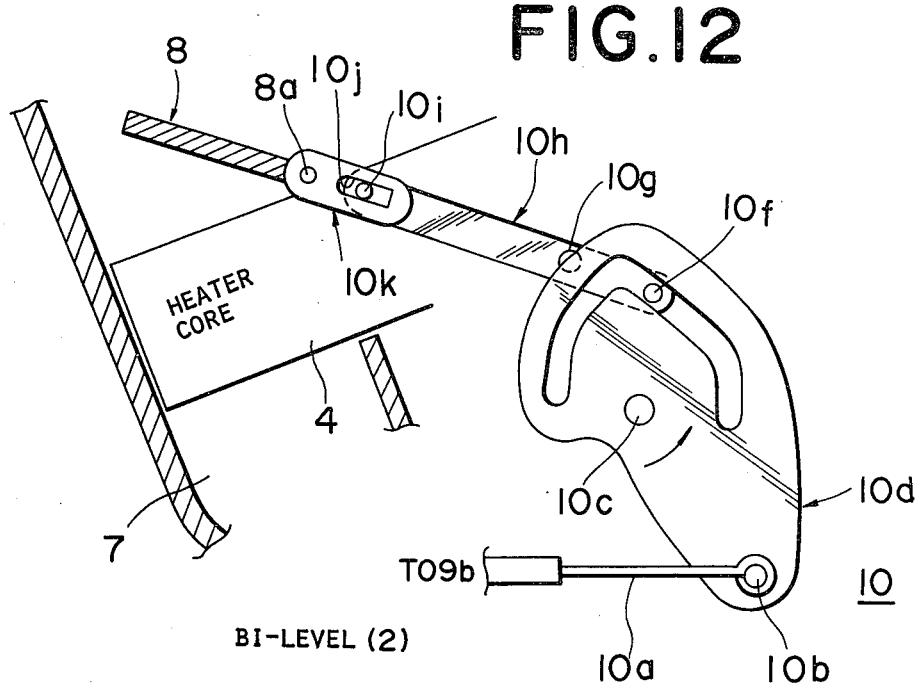
FIG. 12 shows the relative movement of the smaller door when the mode selection lever is moved from the first end to a second end of the "BI-LEVEL" range of the control panel in the third preferred embodiment.

(4) As shown in FIG. 12 of the "BI-LEVEL"(2) and 13 of the "BI-LEVEL"(3), the mode selection lever 9 is moved from the right-hand end 13a to the left-hand end 13b of the "BI-LEVEL" mode range.

Figure 13:
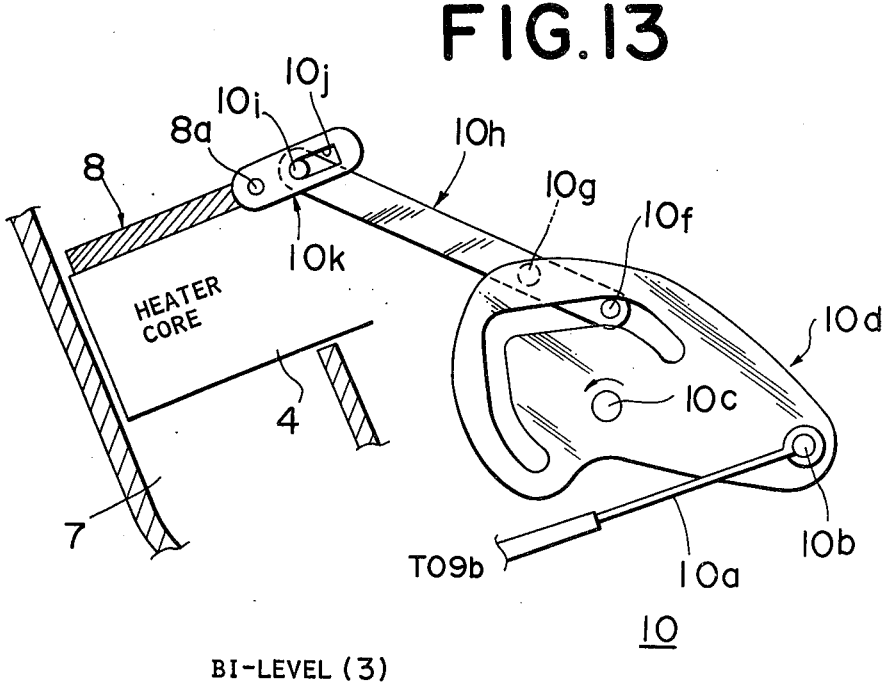
FIG. 13 shows the relative movement of the smaller door when the mode selection lever is moved to the second end of the "BI-LEVEL" range of the control panel in the third preferred embodiment.

The rotatable link 10d rotates counterclockwise about the supporting pin 10c, the angle of rotation depending on the displacement of the mode selection lever 9. The shape of the segment 10e₃ of the groove 10e is designed so that the distance from the center to the groove 10e is gradually decreased. Therefore, as the angle of the smaller door 8 is gradually decreased, the temperature difference between the air from the ventilation outlet 1b and that from the floor outlet 1c becomes smaller. As shown in FIG. 13, when the projection 10f of the rotating arm 10h is positioned at the right-hand end of the segment 10e₃ of the groove 10e, the smaller door 8 is fully closed so that the temperature difference between air from the ventilation and floor outlets is at a minimum.

Figure 14:
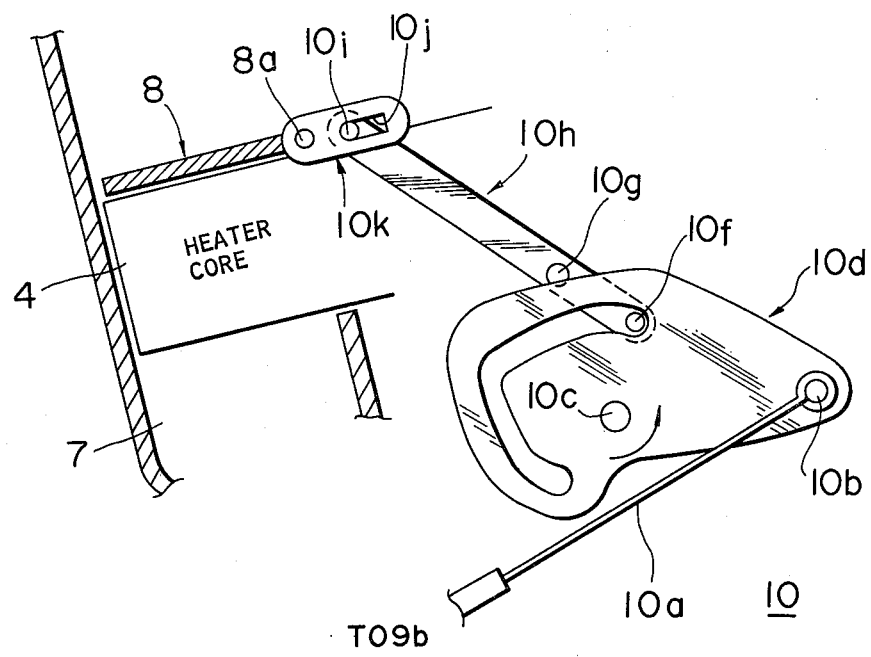
FIG. 14 shows the relative movement of the smaller door when the mode selection lever is moved to the "VENT" position of the control panel.

(5) As shown in FIG. 14, the mode selection lever 9 is moved toward the "VENT" position.

The rotatable link 10d rotates fully counterclockwise about the supporting pin 10c depending on the displacement of the mode selection lever 9. The shape of the segment 10e₄ of the groove 10e is another substantially circular arc to a second end of the groove 10e with the supporting pin 10c as its center. Consequently, neither the rotatable arm 10h nor the linkage 10k rotates and the smaller door 8 is maintained in its fully closed position.

Figure 15:
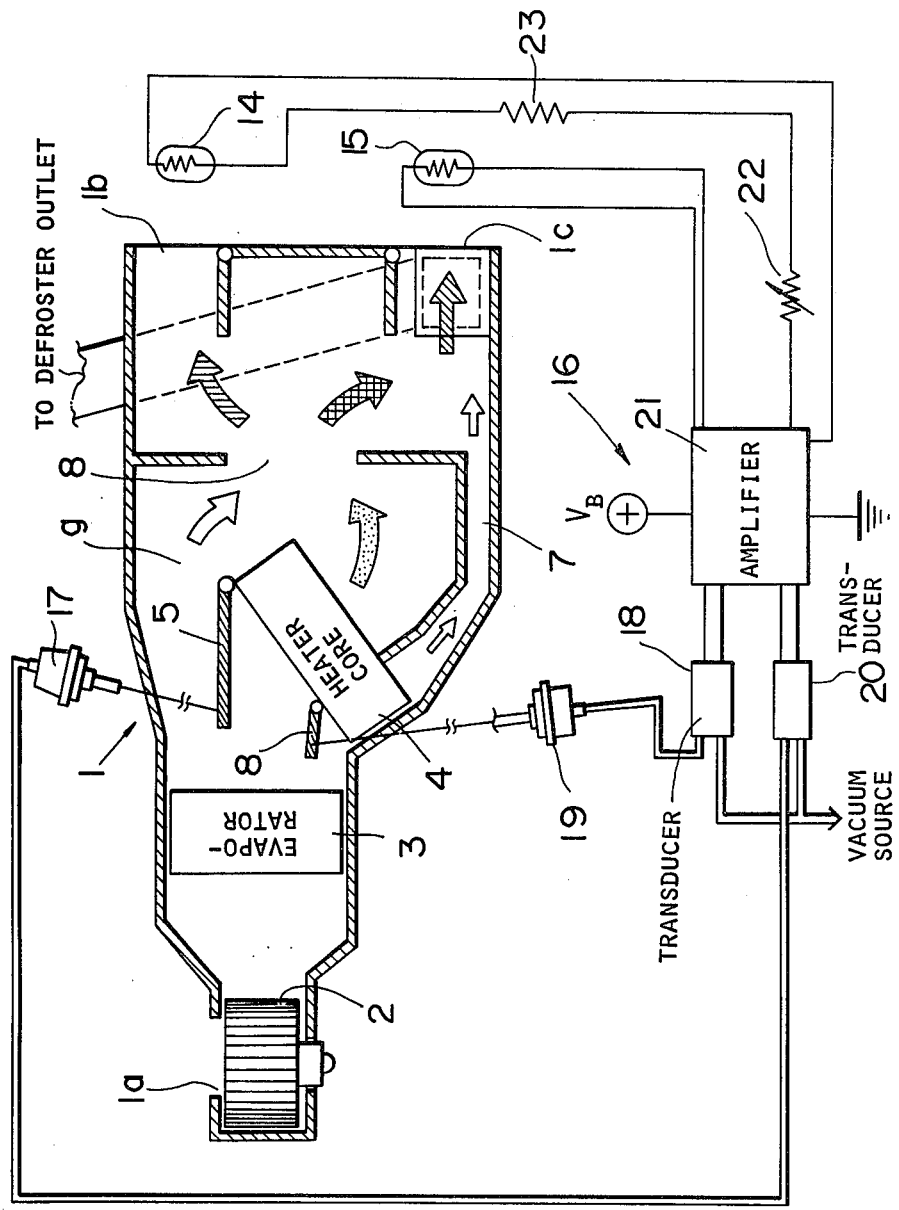
FIG. 15 is sectional view of an air conditioner in a fourth preferred embodiment wherein the temperature difference between the air from the ventilation outlet and that from the floor outlet is detected so that the adjustment of the angle of both the air mixing door and the smaller door can be made.
Figure 16:
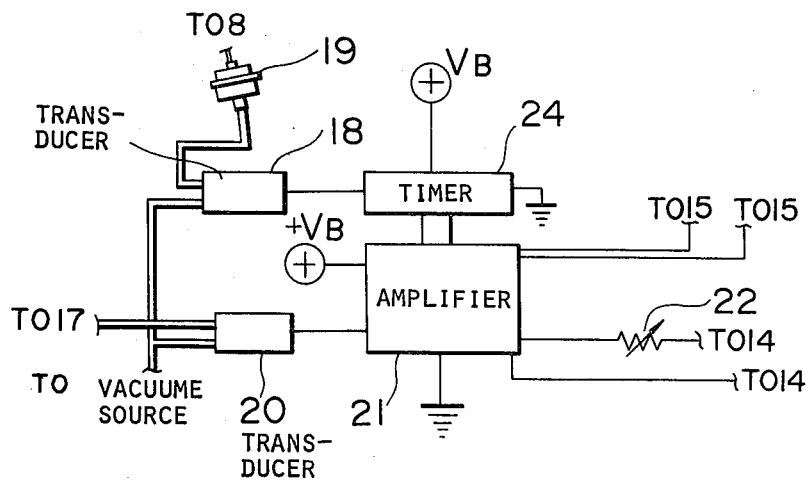
FIG. 16 is a sectional view of an air-conditioner in the fourth preferred embodiment wherein a timer is provided between an amplifier and vacuum transducer.
Figure 17:
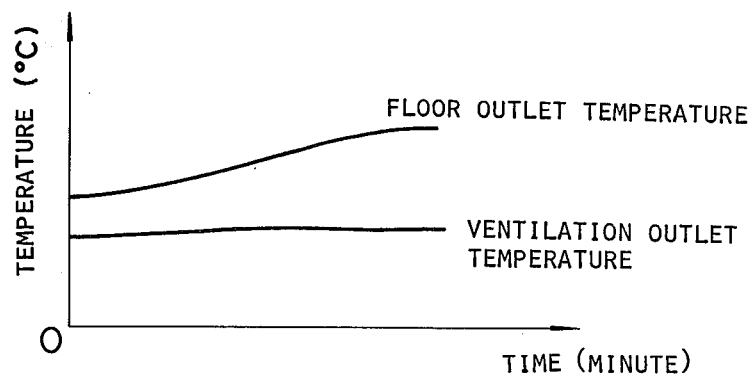
FIG. 17 is a graph showing a gradual temperature rise in the floor outlet temperature relative to the ventilation outlet temperature.

FIG. 15 is an overall block diagram of a fourth preferred embodiment of the air-conditioner according to the present invention which performs the adjustment of the angle of the air mixing door 5 and the smaller door 8 by detecting the difference in air temperature between the ventilation outlet 1b and the floor outlet 1c. In addition to the air-conditioner of the construction described in the first or second preferred embodiment, a first sensor 14 detecting the air temperature at the ventilation outlet 1b, a second sensor 15 detecting the air temperature at the floor outlet 1c, and a door angle adjustment mechanism 16 adjusting the angle of the air mixing door 5 and the smaller door 8 to maintain constant the temperature difference between the air from the ventilation outlet 1b and the floor outlet 1c which is detected by means of these first and second sensors 14 and 15. The door angle adjustment mechanism 16 comprises a first actuator 17 adjusting the angle of the air mixing door 5 according to vacuum pressure; a second actuator 19 adjusting the angle of the smaller door 8 according to vacuum pressure; a first vacuum transducer 18 sending a vacuum pressure according to the level of an electrical signal to the second actuator 19, and an amplifier 21 which calculates the air temperature at the ventilation outlet 1b and at the floor outlet 1c and sends the electrical signal to the first vacuum transducer 18 so as to adjust the angle of the smaller door 8. Numeral 20 denotes a second vacuum transducer which sends vacuum pressure to the first actuator 17 according to the level of an electrical signal from the amplifier 21. Numeral 22 denotes a variable resistor by which the air temperature within the passenger compartment is determined. FIG. 16 shows the air-conditioner shown in FIG. 15 wherein a timer 24 is provided between the first vacuum transducer 18 and the amplifier 21. As a result, the air temperature at the floor outlet 1c is gradually increased as shown in FIG. 17.

According to the present invention, there is provided an air-conditioner whose output of air in the BI-LEVEL mode from the floor outlet is blown out at the level of the floor of the automotive vehicle body at a predetermined higher temperature than that from the ventilation outlet so as to be more comfortable for the occupants.

It will be fully understood by those skilled in the art that the foregoing description is in terms of preferred embodiments of the present invention wherein various changes and modifications may be made without departing from the spirit and scope of the present invention, which is to be defined by the appended claims.

What is claimed is:

1. An air-conditioner for an automotive vehicle comprising:
   (a) a duct having an air inlet at one end thereof and a ventilation outlet at the upper part of the other end thereof and a floor outlet linked to a defroster outlet at the lower part of the other end thereof;
   (b) a blower disposed at the air inlet for introducing air into said duct;
   (c) an evaporator disposed downstream of said duct for cooling the air introduced by said blower;
   (d) a heater core disposed downstream of said evaporator whose upper side is provided with a first bypass for bypassing the cooled air from said evaporator;
   (e) an air mixing door disposed upstream of the heater core for adjusting the amount of air passing through the heater core;
   (f) an air mixing chamber disposed downstream of the heater core and the first bypass for mixing the air from the first bypass and heater core, the ratio of the two types of air depending on the angle of said air mixing door;
   (g) a second bypass disposed between said heater core and said air mixing chamber for introducing part of the heated air from said heater core directly into the floor outlet; and
   (h) a smaller door located at said heater core for adjusting the amount of heated air passing through said second bypass.

2. An air-conditioner as set forth in claim 1, wherein said smaller door is juxtaposed to said air mixing door so that both the air mixing door and the smaller door are disposed upstream of said heater core to adjust the amount of air introduced within said duct to be passed through said heater core.

3. An air-conditioner as set forth in claim 1, wherein said air mixing door is disposed upstream of said heater core to adjust the amount of air passing through said heater core and said smaller door is disposed in front of said second bypass to adjust the amount of heated air passed through said heater core by means of said air mixing door into said second bypass.

4. An air-conditioner as set forth in any one of claims 1, 2 and 3, wherein the air-conditioner further comprises:
   (a) a lever located on the control panel of the air-conditioner for selecting the mode of conditioned air blowing out from at least one outlet of said duct according to the position of setting thereof; and
   (b) an interlocking device connected between said mode selection lever and smaller door for transmitting the displacement of said mode selection lever to said smaller door so that said smaller door rotates to adjust the amount of heated air passing through said second bypass.

5. An air conditioner as set forth in claim 4, wherein said mode selection lever is rotated about its supporting pin and said interlocking device comprises:
   (a) a cable whose one end is pivotally supported at one end of said mode selection lever;
   (b) a rotatable link whose one end pivotally supports the other end of said cable, rotated about its supporting pin, and provided with a groove at a position opposite to the cable supporting end;
   (c) a rotatable arm whose one end is provided with a first projection fitted into a segment of the groove and whose other end is provided with a second projection and is rotated about its supporting pin; and
   (d) a linkage whose one end is provided with a slot in which the second projection of said rotatable arm is fitted and whose other end is fixed to the hinge pin of said smaller door.

6. An air-conditioner as set forth in claim 5, wherein the groove of said rotatable link is of substantially inversed L shape into which the first projection of said rotatable arm is movably fitted and comprises four segments between the first and second ends of the groove; first segment extending from the first end being substantially circular arc with the supporting pin as a center, second segment extending from the first segment being formed to have the distance from the supporting pin longer as it extends, third segment extending from the second segment being formed to have the distance from the supporting pin shorter as its extends, fourth segment extending from the third segment to the second end of the groove being substantially circular arc with the supporting pin as a center.

7. An air-conditioner as set forth in claim 6, wherein the first projection of said rotatable arm is placed at the first end of the groove of said rotatable link and the second projection of said rotatable arm is placed at the first end of the slot of said when said mode selection lever is placed at a defrosting mode, whereby said smaller door is fully closed to cut off the air flow through said second bypass.

8. An air conditioner as set forth in claim 6, wherein the first projection of said rotatable is moved from the first end to the first segment of the groove of said rotatable link when said mode selection lever is moved from the defrosting mode position to the heating mode position, whereby the second projection of said rotatable arm is still at the first end of the slot of said linkage so that said smaller door remains fully closed.

9. An air-conditioner as set forth in claim 6, wherein the first projection of said rotatable arm is moved through the second segment at a boundary to the third segment of the groove said rotatable link when said mode selection lever is moved from the heating mode position to a first end of the "BI-LEVEL" mode range, whereby the second projection of said rotatable arm is placed at a second end of the slot of said linkage and said smaller door is rotated about the hinge pin to open fully to maximize the heated air flow through said second bypass.

10. An air-conditioner as set forth in claim 6, wherein the first projection of said rotatable arm is moved from the boundary to the second segment along the third segment to the fourth segment of the groove of said rotatable link according to the displacement of said mode selection lever from the first end of the "BI-LEVEL" mode range when said mode selection lever is moved from the first end to a second end in the "BI-LEVEL" mode range, whereby said smaller door is gradually closed to adjust the heated air flow through said second bypass and fully closed when said mode selection lever is placed at the second end of the "BI-LEVEL" mode range.

11. An air-conditioner as set forth in claim 6, wherein the first projection of said rotatable arm is moved along the fourth segment to the second end of the groove of said rotatable link when said mode selection lever is moved from the second end of the "BI-LEVEL" mode range to the ventilation mode position, whereby the second projection of said rotatable arm is placed at the first end of the slot so that said smaller door remains fully closed to cut off the air flow through said second bypass.

12. An air-conditioner as set forth in any one of claims 1, 2 and 3, wherein the air-conditioner further comprises:
   (a) a first temperature sensor located beside the ventilation outlet of said duct for detecting and signaling the air temperature at the ventilation outlet;
   (b) a second temperature sensor located beside the floor outlet of said duct for detecting and signaling the air temperature at the floor outlet; and
   (c) a door angle adjusting mechanism connected to said first and second temperature sensors for adjusting the angle of both said air mixing door and said smaller door so as to maintain the difference between the air temperature at the ventilation outlet and at the floor outlet constant in the "BI-LEVEL" mode range, whereby the air temperature at the ventilation outlet and at the floor outlet can be automatically controlled.

13. An air-conditioner as set forth in claim 12, wherein said door adjusting mechanism comprises:
   (a) a first actuator linked to said air mixing door for actuating said air mixing door so as to provide an angle for said air mixing door determined by the degree of input vacuum pressure;
   (b) a first vacuum transducer connected to said first actuator and with a vacuum source for converting an electrical signal into a vacuum pressure and outputting the vacuum pressure signal to said first actuator;
   (c) a second actuator linked to said smaller door for actuating said smaller door so as to provide an angle for said smaller door determined by a degree of input vacuum pressure;
   (d) a second vacuum transducer connected to said second actuator and the vacuum source for converting an electrical signal into a vacuum pressure and outputting the vacuum pressure signal to said second actuator; and
   (e) an amplifier connected between said first and second vacuum transducers and said first and second temperature sensors connected to a temperature setting variable resistor for calculating the air temperature at the ventilation outlet and at the floor outlet detected by said first and second temperature sensors, respectively, and outputting the electrical signal to said second vacuum transducer to adjust the angle of said smaller door so that the air temperature at the floor outlet is higher by a constant amount than that at the ventilation outlet.

14. An air-conditioner as set forth in claim 13, which further comprises a timer connected between said amplifier and second vacuum transducer for delaying the input timing of the electrical signal into said second vacuum transducer, whereby the air temperature at the floor outlet is increased gradually at the initial stage.

* * * * *